Figure 2:
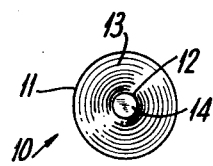

Aug. 17, 1965  G. LEHNERT  3,201,563
WELDING ELECTRODE
Filed April 17, 1962

INVENTOR.
GUNTHER LEHNERT
BY
*Philip E. Hilbert*
ATTORNEY.

3,201,563
WELDING ELECTRODE
Gunther Lehnert, Hannover-Bothfeld, Germany, assignor to Hackethal Draht- und Kabel-Werke AG, Hannover, Germany, a corporation of Germany
Filed Apr. 17, 1962, Ser. No. 188,145
Claims priority, application Germany, Apr. 18, 1961, H 42,330
2 Claims. (Cl. 219—145)

This invention relates to a welding electrode and more particularly concerns cylindrical direct current electrodes of the type particularly adapted to self-weld seams in the adjacent edges of thin metal sheets where the electrode is shielded with an inert gas to prevent oxidation of the welded seam.

Conventional gas shielded cylindrical electrodes used in arc welding the longitudinal joint in butt seamed tubing formed of thin metal, have a rather short useful life. As the speed of production of such butt welded tubing is increased, the welding current and current density is also increased. The thermal capacity of known electrodes used in this procedure, is rather limited, and the electrode is soon bent or burned, causing a flutter in the arc. This in turn gives rise to undesirable thermal cracks and checks in the welded seam.

To overcome the indicated deficiencies of the electrode, it was proposed that the diameter of the electrode be increased. However, with such increase in diameter, the cathode spot of the negative poled electrode has a tendency to wander, which results in wandering and flutter of the arc, again causing cracks and checks in the welded seam. Also, large diameter electrodes show a rather large increase in heat transfer as between the tip of the electrode in the arc zone, to the upper portions of the electrode, resulting in a cooling of the arc zone.

The inner portion of the arc zone is at a very high temperature, causing the vaporized metal given off by the welded metal to break down into ion and electron form. The migration of the negative charged electrons is directed to the positive poled seam portion of the metal tubing being welded, where they give up their kinetic energy. This increases in a desired manner, the heat of fusion of the weld. The migration of the positive charged ions is directed to the negative poled welding electrode where each ion will pick up an electron derived from the electrode to form a new gas molecule.

When the arc zone tends to cool, as when the electrode is badly shaped, the gas molecules will condense in the cooled zone and a barb of metallic material will grow in deposited form at the electrode. The deposit grows rather quickly in a direction toward the arc zone and when such deposit impinges on the arc zone, the metallic content thereof will spray causing flutter in the arc; again causing checks and cracks in the weld seam and leaving the same imperfect.

It was, therefore, found that in view of the indicated circumstances, that the electrode must have an end portion close to the arc zone which is of reduced diameter to retard heat transfer to the upper portions of the electrode; yet the electrode must have sufficient diameter to avoid burning or deformation under thermal load.

Figure 1:
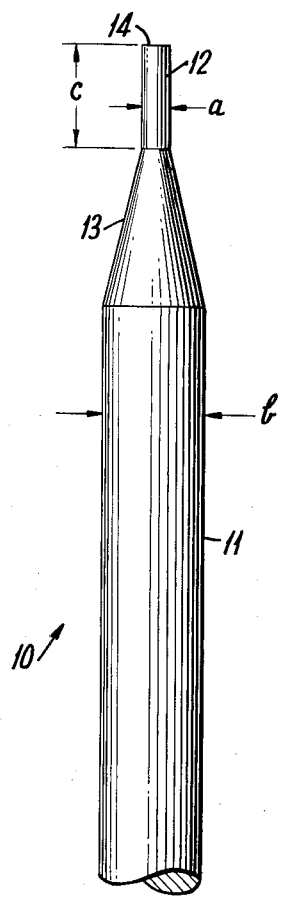

In the drawing. FIG. 1 is a side elevational view of an electrode embodying the invention; and
FIG. 2 is an end view thereof.

In accordance with the instant invention, there is provided a cylindrical electrode having successive longitudinal portions of greater and lesser diameters, which portions are interconnected by a portion whose cross sectional area progressively decreases from the portion of larger diameter to the portion of lesser diameter, the portion of lesser diameter terminating in a plane circular surface. Furthermore, the diameter and longitudinal extent of the portion of smaller diameter are proportioned in relation to the current density so that the temperature of the welding electrode tip portion is less than the melting point of the electrode material and thus providing a nonconsumable electrode. Also, the cathode spot of the negative poled electrode substantially covers the end plane surface of the electrode tip.

As shown in the drawing, 10 designates a welding electrode embodying the invention. The same comprises a cylindrical shaft portion 11, a cylindrical tip portion 12 of a diameter less than that of shaft portion 11, and a conical portion 13 connecting cylindrical portions 11, 12.

With electrode 10, gas molecules given off during the welding procedure, can not condense in the arc zone or areas close thereto, since the conical portion 13 prevents a sudden discharge of heat from tip portion 12 to shaft portion 11, thus leaving the zone adjacent the arc at a temperature which inhibits condensation of the gas molecules. Also, fluttering of the arc is substantially eliminated since the tip surface 14 of tip 12 is related to the current density so that the cathode spot practically covers the surface 14.

By way of example, with tubing being formed from metal sheets having a melting point of 2,700° C. by welding a longitudinal butt seam therein, and with an electrode formed of material having a melting point of 3,400° C., the electrode 10 is dimensioned so that its tip portion 12 in relation to the current density or thermal capacity, is at a temperature below 3,400° C. and above 2,700° C. Thus the critical temperature of tip 12 is kept within a range of about 700°.

In the electrode 10, as shown in FIG. 1, the ratio of the diameter $a$ of tip portion 12, to its length $c$, is about 1:25. Also, the ratio of the diameter $a$ of tip portion 12 to the diameter $b$ of shaft portion $b$ is about 1:2.5. Also, the converging sides of conical portion 13 form an acute angle of about 20°.

With an electrode 10 as described, the end surface 14 thereof was substantially covered by the cathode spot, whereby a constant thermal load at the tip portion 12 was maintained and wandering or flutter of the arc was inhibited. The arc produced was uniform and steady, giving rise to welded seams free of checks or cracks.

As various changes might be made in the embodiment of the invention disclosed without departing from the spirit thereof, it is understood that all matter herein shown or described shall be deemed illustrative and not limiting except as set forth in the appended claims.

What is claimed is:
1. A welding electrode for direct current self welding of butt seams in thin metal sheets comprising a major cylindrical portion of a given diameter, a cylindrical welding end portion of a diameter less than said given diameter, and a conical portion interconnecting said major and cylindrical end portions, wherein the diameters of said cylindrical major and cylindrical end portions are in the ratio of about 2.5:1.0; the ratio of the diameter of said end portion to its length is about 1.0:2.5; and the sides of said conical portion form an angle of about 20°.

2. The method of welding adjacent portions of thin metal sheets with a direct current non-consumable welding electrode having a major cylindrical portion of a given diameter, a cylindrical welding end portion of a diameter less than said given diameter, and a conical portion connecting said major and end portions, the end portion of said electrode being maintained at a temperature less than the melting point of the material of the electrode and greater than the melting point of said thin metal sheets.

References Cited by the Examiner

UNITED STATES PATENTS

| | | | |
|---|---|---|---|
| 1,324,337 | 12/19 | Chapman et al. | 219—70 |
| 2,769,079 | 10/56 | Briggs | 219—75 |
| 2,890,109 | 6/59 | Cooper | 75—10 X |
| 3,019,330 | 1/62 | Guida | 219—145 |

RICHARD M. WOOD, *Primary Examiner.*